United States Patent [19]

Ando et al.

[11] Patent Number: 5,085,103
[45] Date of Patent: Feb. 4, 1992

[54] HYDRAULIC CONTROL APPARATUS FOR AUTOMATIC TRANSMISSIONS

[75] Inventors: Masahiko Ando; Kazuhisa Ozaki; Hiroshi Niki, all of Anjo, Japan

[73] Assignee: Aisin AW Co., Ltd., Japan

[21] Appl. No.: 356,993

[22] Filed: May 25, 1989

[30] Foreign Application Priority Data

May 27, 1988 [JP] Japan .................. 63-129776

[51] Int. Cl.⁵ .......................................... B60K 41/06
[52] U.S. Cl. ...................................... 74/868; 74/866
[58] Field of Search .................. 74/866, 867, 868, 869

[56] References Cited

U.S. PATENT DOCUMENTS

| | | | |
|---|---|---|---|
| 4,488,457 | 12/1984 | Nishimura et al. | 74/869 X |
| 4,494,423 | 1/1985 | McCarthy et al. | 74/869 |
| 4,631,982 | 12/1986 | Miki et al. | 74/869 |
| 4,730,521 | 3/1988 | Yayasaki et al. | 74/868 X |
| 4,753,134 | 6/1988 | Hayasaki | 74/866 |
| 4,787,258 | 11/1988 | Yamamoto et al. | 74/869 X |
| 4,840,092 | 6/1989 | Sakaguchi et al. | 74/869 |

FOREIGN PATENT DOCUMENTS

| | | | |
|---|---|---|---|
| 55-149454 | 11/1980 | Japan | 74/869 |
| 62-80337 | 4/1987 | Japan | 74/869 |

Primary Examiner—Leslie A. Braun
Assistant Examiner—Benjamin Levi
Attorney, Agent, or Firm—Lorusso & Loud

[57] ABSTRACT

An automatic transmission for an automotive vehicle has a plurality of friction devices for selectively coupling a number of rotary elements in a planetary gear mechanism to one another, and a hydraulic circuit for controlling changeover of the friction devices. The hydraulic circuit includes a regulator valve for generating line pressure, a manual valve for selectively changing over the line pressure to the hydraulic circuit, a plurality of shift solenoids for directly controlling engaging hydraulic pressure of the friction devices by duty control when a shift is made, and a plurality of relay valves controlled by the solenoid valves, wherein the solenoid valves are duty-controlled independently of one another. With such an arrangement, one accumulator is sufficient and the number of valves can be reduced, so that the valve body can be made more compact. In addition, highly precise shock control is possible with regard to all shift conditions.

17 Claims, 20 Drawing Sheets

|  |  | SOLENOID | | | | CLUTCH & BRAKES | | | | | O.W.D |
|---|---|---|---|---|---|---|---|---|---|---|---|
|  |  | C-1 | B-1 | C-0 | L-up | C-1 | C-2 | C-0 | B-1 | B-2 | F-1 |
| P |  | ○ | × | ○ | ※ | × | × | × | × | × | × |
| R |  | ○ | × | ○ | ※ | × | ○ | × | × | ○ | × |
| N |  | ○ | × | ○ | ※ | × | × | × | × | × | × |
| D (3) 2 | 1ST | × | × | ○ | ※ | ○ | × | × | × | × | ○ |
| | 2ND | × | ○ | ○ | ※ | ○ | × | × | ○ | × | × |
| | 3RD | × | ○ | × | ◎ | ○ | × | ○ | ● | × | × |
| | 4TH | ○ | ○ | × | ◎ | × | × | ○ | ○ | × | × |
| L | 1ST | × | × | ○ | ※ | ○ | × | × | × | ○ | ○ |
| | 2ND | × | ○ | ○ | ※ | ○ | × | × | ○ | × | × |

○ : SOLENOID ENERGIZED   ○ : CLUTCH ENGAGED
◎ : SOLENOID ENERGIZED L-up ON   ● : B-1 RELEASED BY C-0 ENGAGING PRESSURE
× : SOLENOID DEENERGIZED   × : CLUTCH RELEASED
※ SOLENOID ENERGIZED AT THROTTLE OPENING 0~7.0%
SOLENOID DEENERGIZED AT THROTTLE OPENING 7.0~100%

FIG. 3

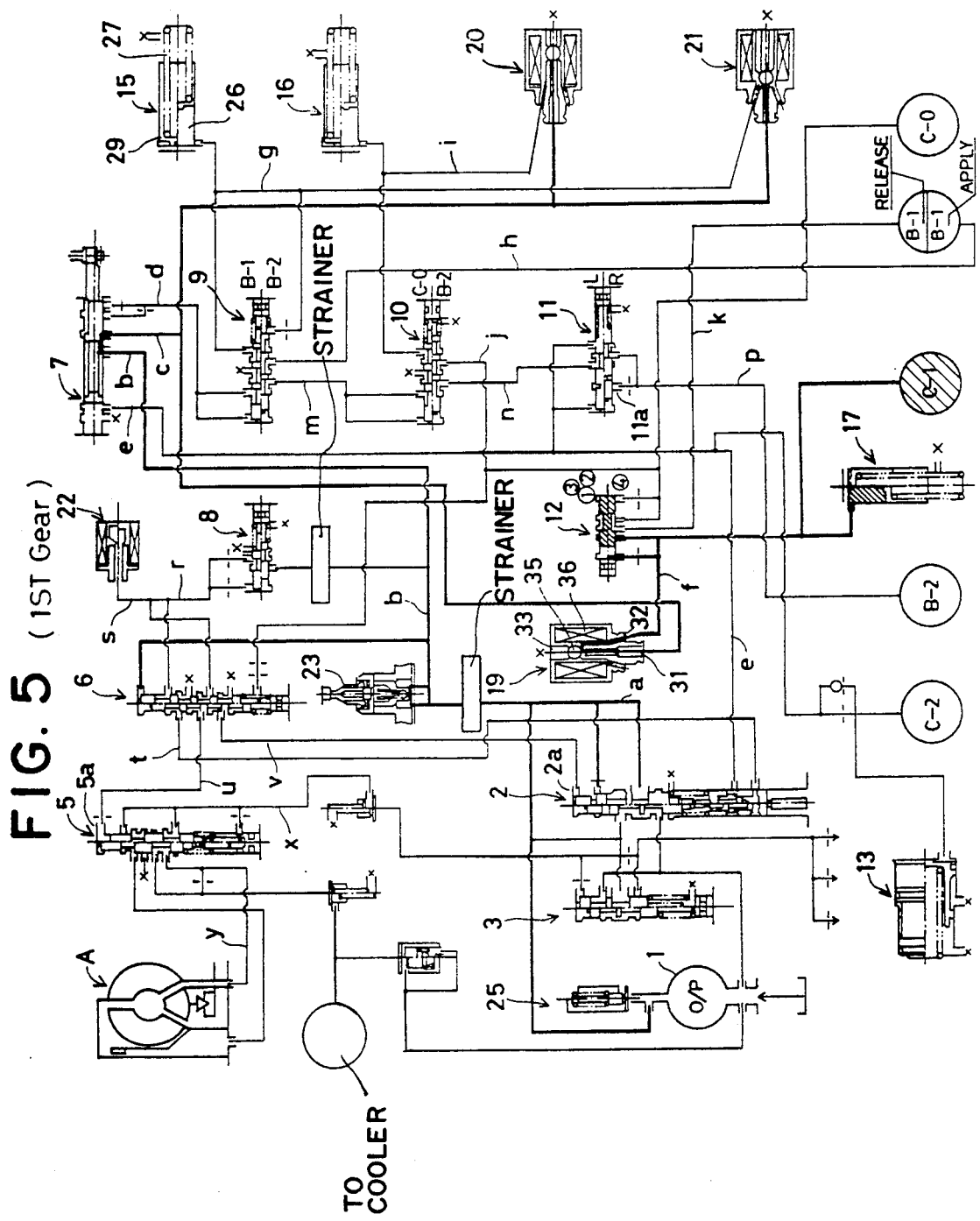

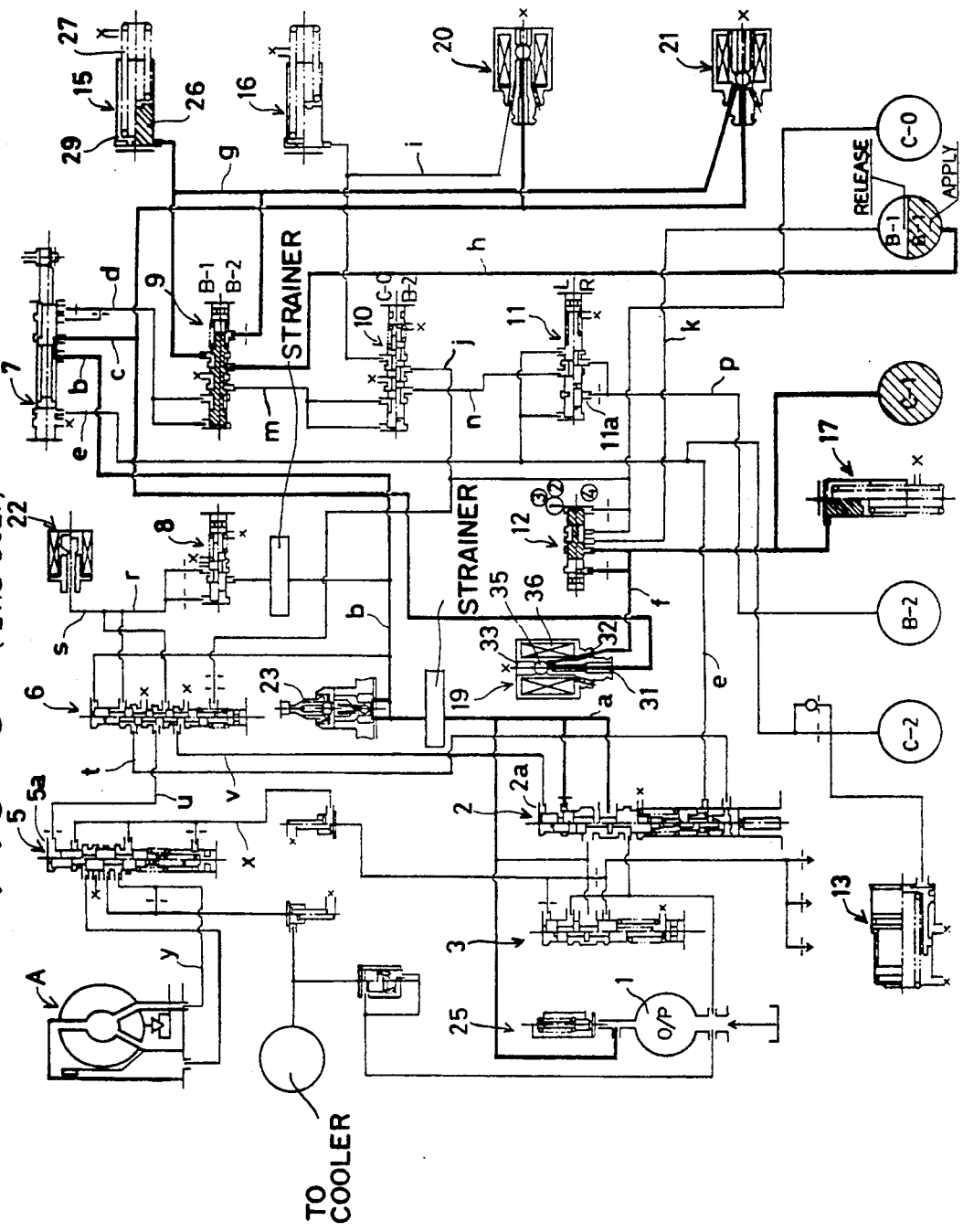
FIG. 6 (2nd Gear)

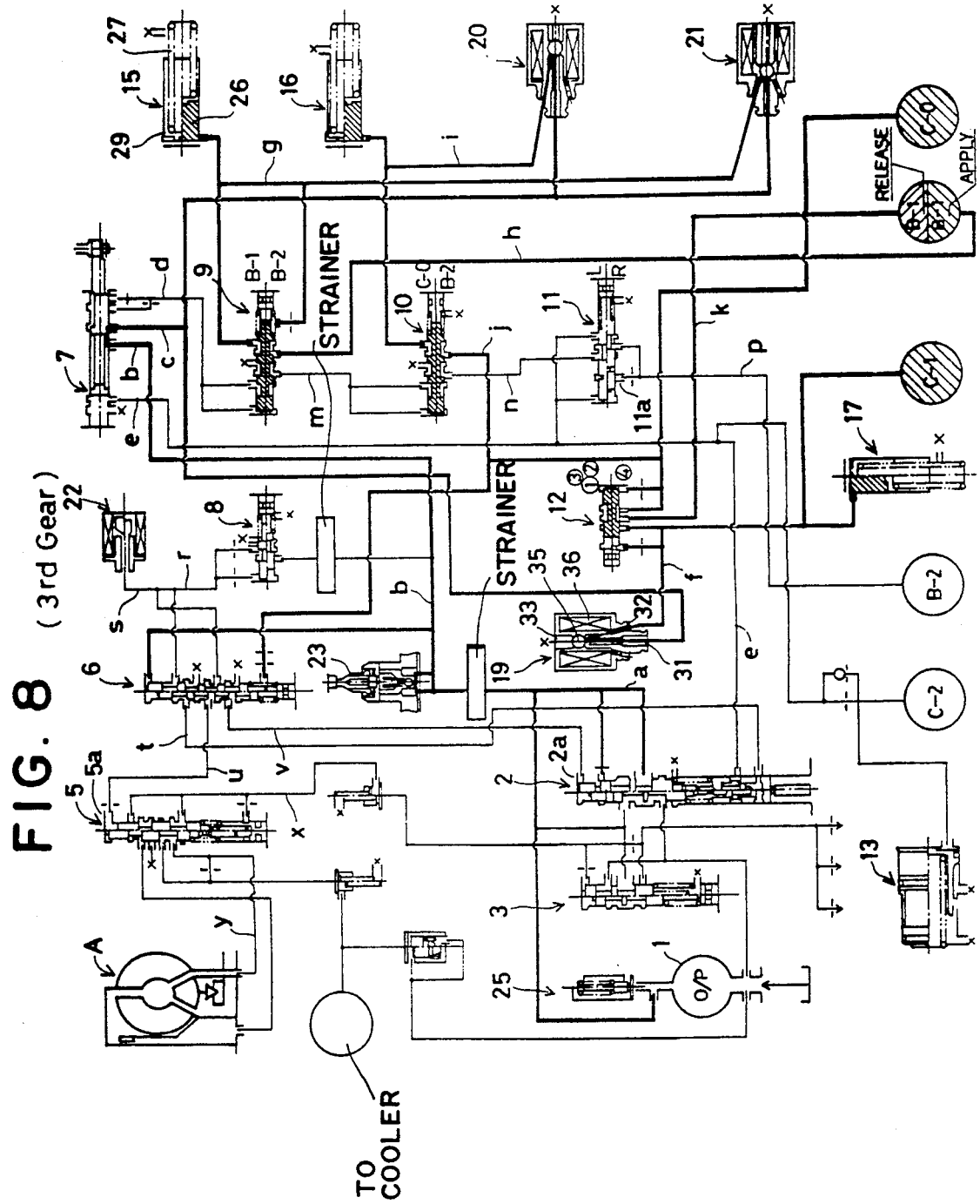
FIG. 8 (3rd Gear)

3→4 SHIFT (C-0 SOLENOID DUTY RATIO IS 0%; OPENED STATE)

4→3 SHIFT a, b, c, t, t' REPRESENT CHANGES DUE TO THROTTLE OPENING

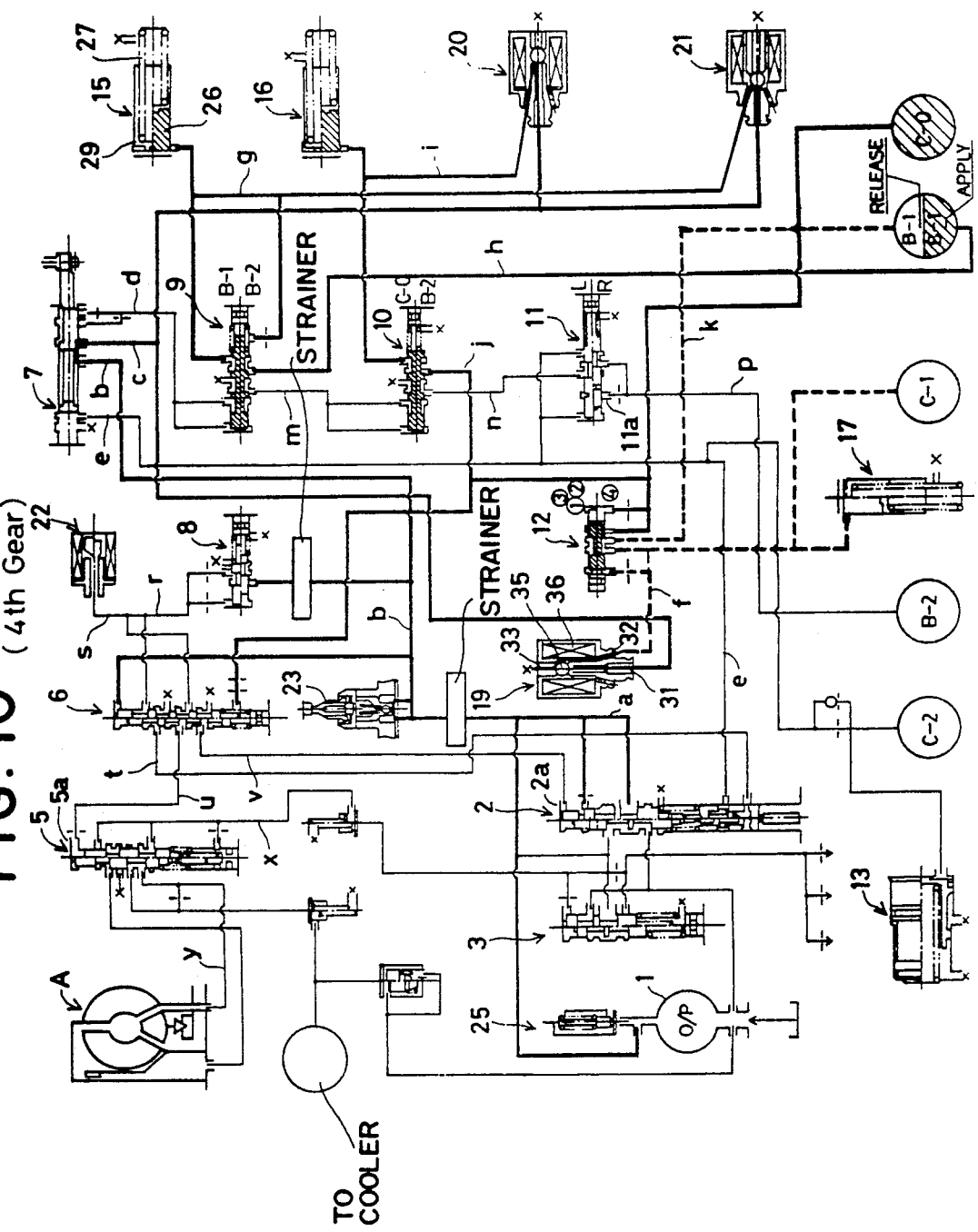
FIG. 10 (4th Gear)

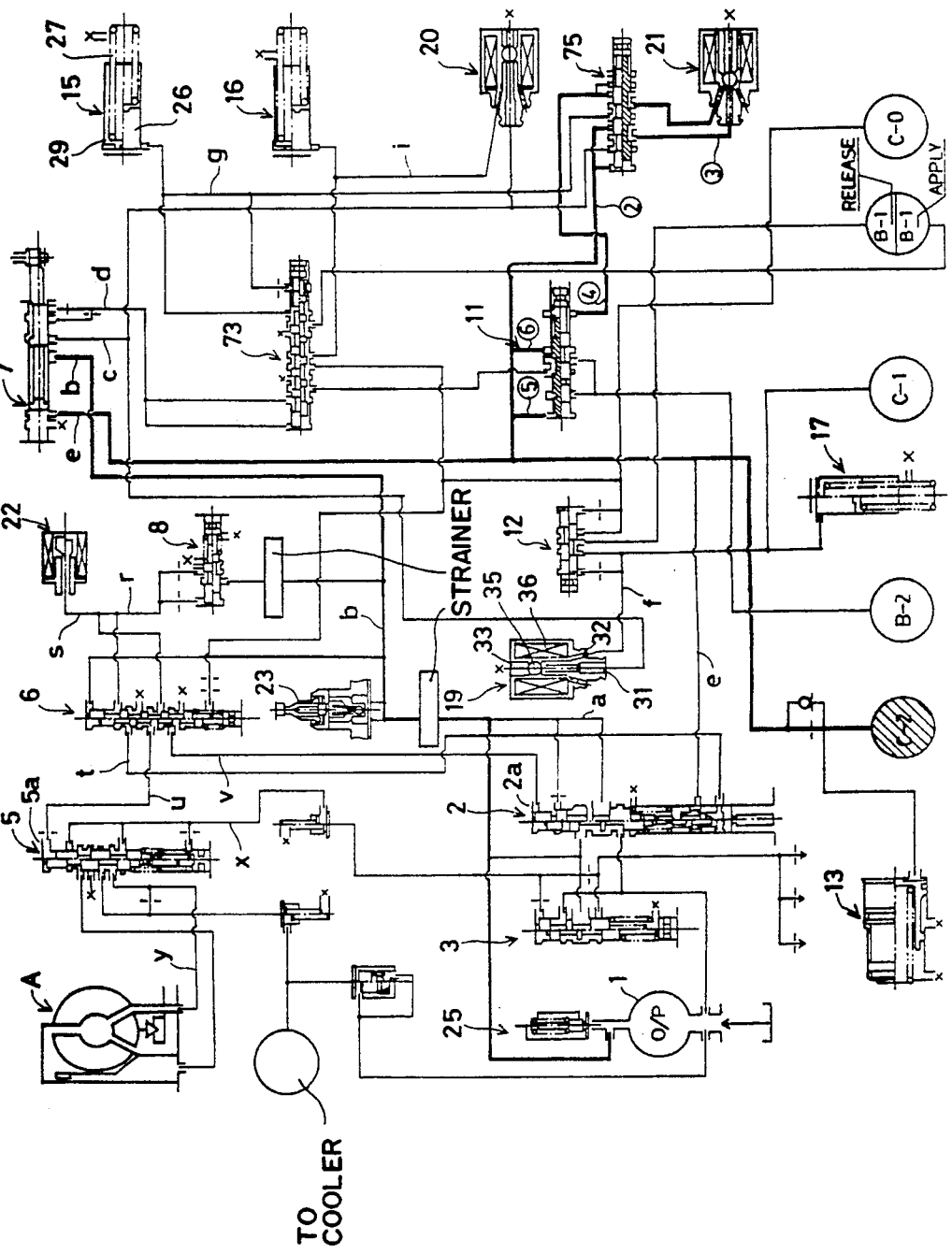

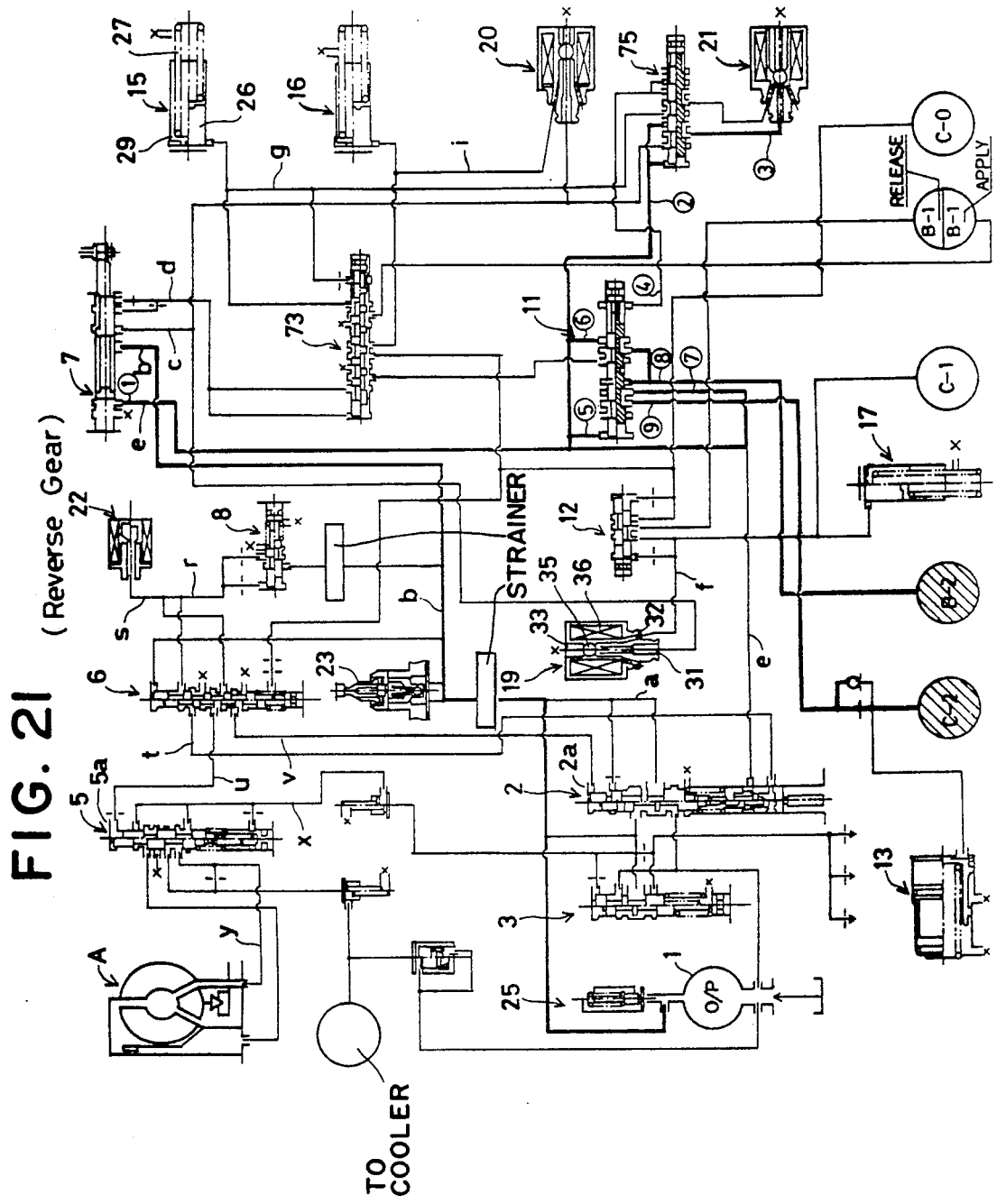

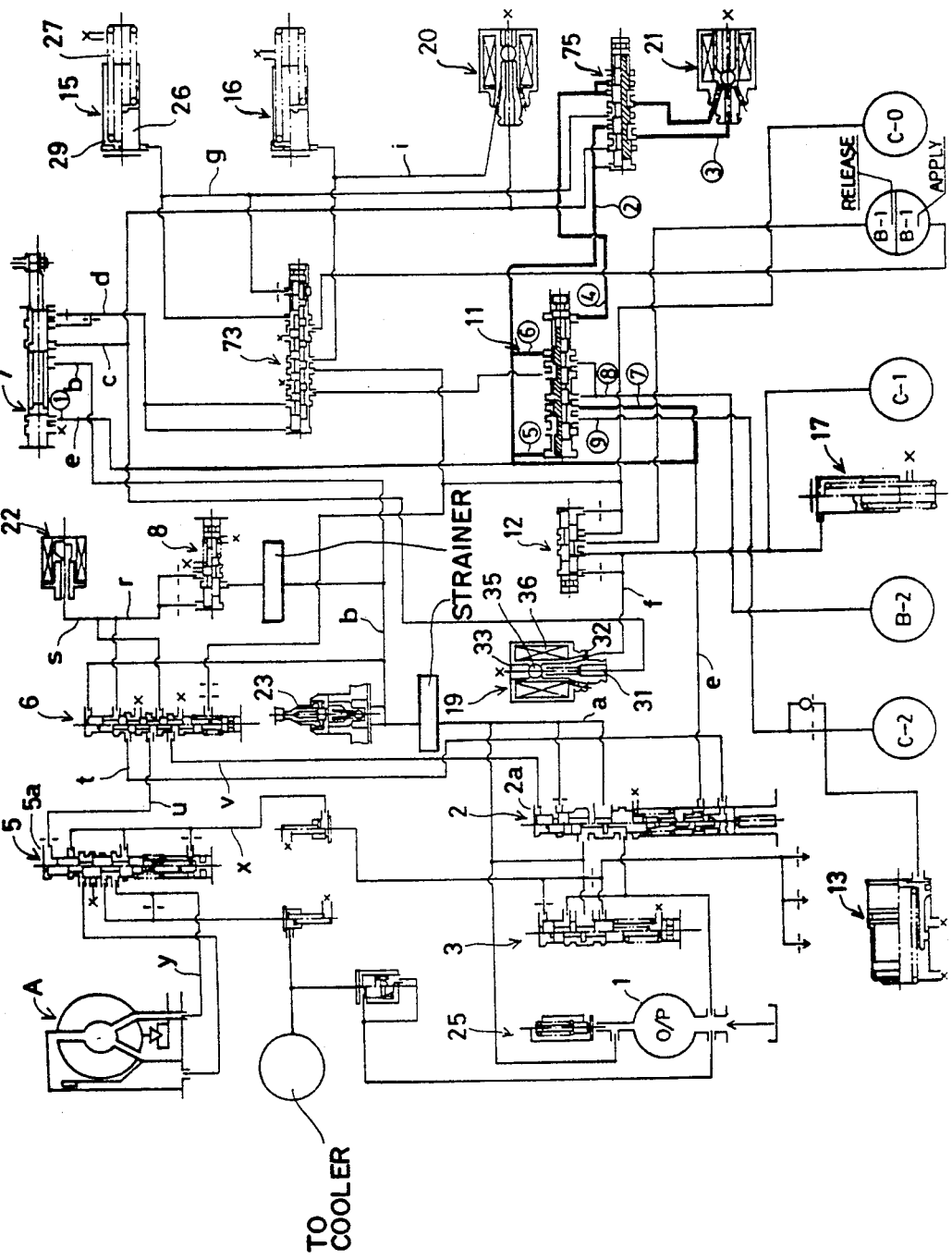
FIG. 22 (Reverse-Inhibit)

5,085,103

HYDRAULIC CONTROL APPARATUS FOR AUTOMATIC TRANSMISSIONS

BACKGROUND OF THE INVENTION

This invention relates to a hydraulic control apparatus in an automatic transmission for an automotive vehicle.

In general, an automatic transmission for an automotive vehicle is equipped with a planetary gear mechanism and a plurality of friction devices each comprising a clutch or brake. The engaging states of these friction devices are changed over in a variety of ways to selectively couple several rotary elements in the planetary gear mechanism with one another or brake the rotating motion of these elements, thereby automatically establishing the optimum speed with regard to the running state of the vehicle at such time. To this end, control for changing over the friction devices ordinarily is carried out by a hydraulic circuit. Specifically, control is performed by manually operating a manual lever in the passenger compartment to position a manual valve connected to the lever by a link and cable. The supply and discharge of oil pressure to and from each friction device generally is performed by a plurality of speed-changing shift valves, such as a 1-2 shift valve, 2-3 shift valve and 3-4 shift valve. Meanwhile, vehicle velocity and throttle opening signals conforming to the running state of the vehicle are fed into an electronic control circuit. The latter renders a decision upon making a comparison with a previously stored shift pattern and, based on the decision, actuates solenoid valves provided in the hydraulic circuit, thereby controlling the changeover of the aforementioned shift valves to achieve the gear best suited to the running state of the vehicle. The engaging pressure characteristic of each friction device is set by an accumulator.

Further, line pressure in the hydraulic circuit is controlled using a cable cam-type throttle valve or a linear solenoid.

The hydraulic circuit is so designed that if a solenoid should happen to become disconnected or severed, the circuit will function to assure, e.g., second gear in forward, the reverse gear or the neutral state, and mechanical locking will not occur even if the shift valves are changed over in all types of combinations.

Modern compact cars must be designed to have a compact automatic transmission possessing a number of speeds, i.e., three or four. Though the mechanical portion of the gear train and the like is designed to be compact, the size of the hydraulic control section controlling the speeds of the transmission generally is related to the number of speeds and is independent of the size of the gear train. As a result, it is difficult to make the hydraulic control section small in size.

In conventional automatic transmissions for automotive vehicles, the shift valves that are changed over in accordance with throttle opening and vehicle velocity, the throttle valve for controlling line pressure and the accumulators for setting the engaging pressure characteristics of the friction devices are incorporated within the transmission. When a large number of speeds are provided, therefore, the number of shift valves and accumulators required increases, the valve body becomes large in size and the hydraulic circuit becomes more complicated. In addition, weight, volume and cost increase. As a consequence, obstacles are encountered in reducing the size and cost of the automatic transmission.

An accumulator is for deciding the characteristic of engaging pressure by an orifice and spring force. To this end, the accumulator is adapted to perform precise shock control with respect to all shift conditions, such as throttle opening, vehicle velocity and oil temperature, and difficulties are encountered in tuning the accumulator to different types of automatic transmissions.

Furthermore, since three friction devices C0, C1, B1 are controlled at different times when making shifts from 2nd to 3rd and from 3rd to 4th, a large time lag is involved. Also, clutch pressure cannot be freely controlled. Consequently, when a speed change is made by changing over engagement between clutches or between clutches and brakes without using a one-way clutch, a large shock is produced at shifting.

SUMMARY OF THE INVENTION

An object of the present invention is to provide a hydraulic control apparatus for an automotive vehicle, in which the hydraulic circuit can be simply constructed and reduced in size, and in which extremely fine shock control is possible with regard to all shift conditions.

According to the present invention, the foregoing object is attained by providing a hydraulic control apparatus for a vehicular automatic transmission having a plurality of friction devices for selectively coupling a number of rotary elements in a planetary gear mechanism to one another, and a hydraulic circuit for controlling changeover of the friction devices, characterized in that the hydraulic circuit comprises a regulator valve for generating line pressure, a manual valve for selectively changing over the line pressure to the hydraulic circuit, a plurality of shift solenoids for directly controlling engaging hydraulic pressure of the friction devices by duty control when a shift is made, and a plurality of relay valves controlled by the solenoid valves, wherein the solenoid valves are duty-controlled independently of one another.

Another characterizing feature is that two of the friction devices used when shifting between 2nd gear and 3rd gear or between 3rd gear and 4th gear are so arranged that engaging or releasing one of the friction devices releases or engages the other friction device.

The invention is characterized in that the hydraulic circuit further comprises a lock-up control valve for controlling a lock-up clutch, a lock-up relay valve for feeding control hydraulic pressure to the lock-up control valve and the regulator valve, and a solenoid valve for supplying hydraulic pressure to the lock-up relay valve, wherein controlling the solenoid valve controls line pressure in dependence upon throttle opening when shifting between 2nd and 3rd gears, and controls the lock-up clutch when shifting between 3rd and 4th gears.

In another aspect, the invention is characterized in that the hydraulic circuit further comprises a low modulator valve for regulating hydraulic pressure in the low range and effecting a changeover with the reverse range, and a reverse relay valve for inhibiting a changeover to reverse in the low modulator valve if vehicle velocity is above a fixed vehicle velocity when a shift is made to reverse.

The present invention provides the following actions and effects:

(1) One accumulator is sufficient and the, number of valves can be reduced, so that the hydraulic control circuit can be made more compact. This makes it possible to mount a small-size transmission in a compact car and to control such a small-size transmission over a number of speeds.

(b) Highly precise shock control is possible for all shift conditions.

(c) Transmission shock can be sufficiently absorbed even when a shift is made by changing the engagement between clutches or between clutches and brakes without use of a one-way clutch.

(d) Shock tuning for a wide variety of vehicles having different engine characteristics can be achieved by modification of computer software. This makes it unnecessary to modify transmission hardware.

(e) A throttle valve mechanism can be dispensed with, and both line pressure control and lock-up control can be performed by a single solenoid. This makes possible a further reduction in size.

(f) If power to a solenoid should happen to be cut off, it is possible to place the transmission in parking, neutral, reverse and in 1st and 3rd forward gears by changing over the manual valve. In addition, safety is assured since the structure is such that the transmission will not lock up regardless of whether the solenoid is energized or not, and regardless of the position in which the valve is stuck. In particular, if power to the solenoid should happen to be cut off when the vehicle is traveling in the D range, 3rd gear is established to avoid a sudden stop, spinning, etc.

(g) It is possible to readily provide a safety device which will not allow a transition to drive if the brakes are not being applied when a shift is made from the N range to the D range.

(h) It is possible to readily provide a mechanism which will forbid the transmission from being put in reverse when the vehicle is traveling forward.

Still other objects and advantages of the invention will in part be obvious and will in part be apparent from the specification.

The invention accordingly comprises the features of construction, combinations of elements and arrangement of parts which will be exemplified in the construction hereinafter set forth, and the scope of the invention will be indicated in the claims.

BRIEF DESCRIPTION OF THE DRAWINGS

FIG. 3 is a chart describing the operation of FIGS. 1 and 2;

FIG. 5 is a hydraulic circuit diagram showing the operation of the hydraulic circuit of FIG. 1 in 1st gear in the D range;

FIG. 6 is a hydraulic circuit diagram showing the operation of the hydraulic circuit of FIG. 1 in 2nd gear in the D range;

FIG. 8 is a hydraulic control circuit describing the operation of the hydraulic circuit of FIG. 1 in shifting to 3rd gear in the D range;

FIG. 10 is a hydraulic circuit diagram describing the operation of the hydraulic circuit of FIG. 1 in shifting to 4th gear in the D range;

FIGS. 18 and 19 are hydraulic circuit diagrams of hydraulic circuits equipped with a reverse-inhibit mechanism, in which FIG. 18 illustrates the circuit in reverse and FIG. 19 the circuit when reverse is inhibited;

FIGS. 21 and 22 are hydraulic circuit diagrams of hydraulic circuits equipped with a reverse-inhibit mechanism, in which FIG. 21 illustrates the circuit in reverse and FIG. 22 the circuit when reverse is inhibited.

DESCRIPTION OF THE PREFERRED EMBODIMENTS

Embodiments of the present invention will now be described in detail with reference to the drawings.

Figure 2:
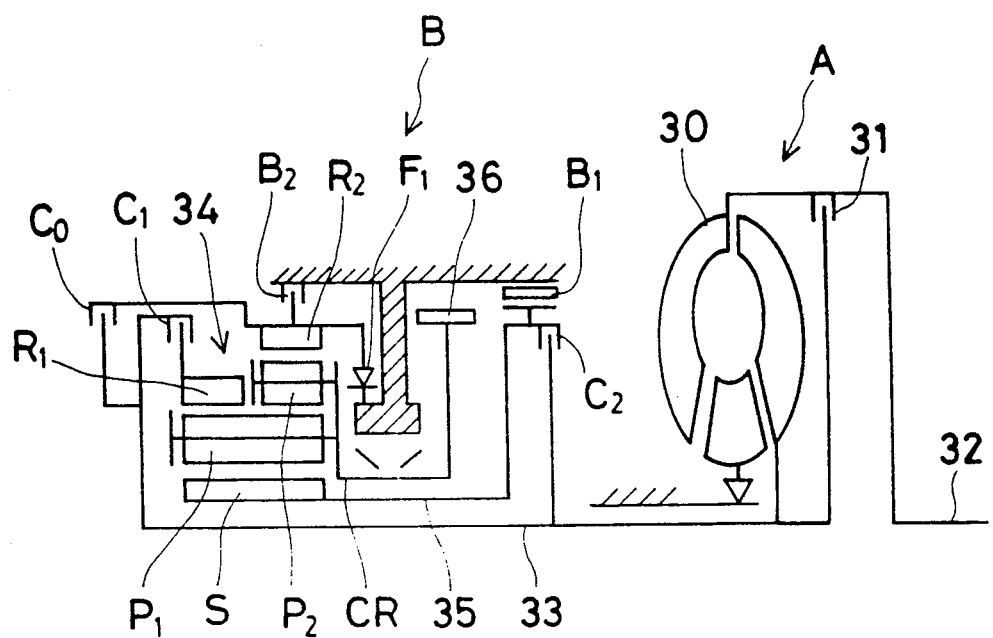
FIG. 2 is structural view showing an example of an automatic transmission to which the invention is applied.

Reference will first be had to FIG. 2 to describe an automatic transmission to which the present invention is applied. A torque converter section A comprises a torque converter 30 and a lock-up clutch 31. The rotation of an engine is transmitted from a crankshaft 32 to an input shaft 33 in an automatic transmission mechanism B via oil within the torque converter 30 or a mechanical connection made by the lock-up clutch 31.

The four-speed automatic transmission mechanism B includes a second clutch C2 and first brake B1; a planetary gear unit 34; and a first clutch C1 and third clutch C0; these being arranged about the input shaft 33 in the order mentioned from the engine output side. A hollow shaft 35 is freely rotatably fitted over the input shaft 33. The planetary gear unit 34, which is of the dual type, has a sun gear S formed on the hollow shaft 35, a small ring gear R1, and a carrier CR supporting a long pinion P1 meshing with these gears. The carrier CR supports also a short pinion P2 meshing with the long pinion P1 and a large ring gear R2.

The second clutch C2 is interposed between the hollow shaft 35 and the input shaft 33. The first brake B1, which comprises a band brake, is capable of contacting and separating from the outer periphery of the second clutch C2. Disposed at substantially the central portion of the automatic transmission mechanism B is a counter-drive gear 36 having its inner periphery splined to the carrier CR. The one-way clutch F1 is splined between the large ring gear R2 of the planetary gear unit 34, and the second brake B2, which is of the clutch type, is interposed between the outer periphery of the large gear R2 and the accelerator housing. The first clutch C1 is interposed between the input shaft 33 and the small ring gear R1 of the planetary gear unit 34, and the third clutch C0 is interposed between the input shaft 33 and the outer periphery of the large gear R2 of the planetary gear unit 34.

The automatic transmission thus constructed can be reduced in size since the planetary gear unit 34 is such that its carrier CR and sun gear S are integrated. In addition, since the counterdrive gear 36 is arranged substantially at the center of the automatic transmission mechanism, the transmission path is reciprocative in nature so that the transmission can be made more compact in the axial direction.

The operation of this automatic transmission constructed as set forth above will now be described with reference to the table of FIG. 3.

At the beginning, the first clutch C1 is engaged in 1st gear. When this is done, the rotating motion of the input shaft 33 is transmitted to the small ring gear R1 via the first clutch C1. Since the large ring gear R2 is prevented from rotating at this time by the one-way clutch Fl, the common carrier CR rotates at greatly reduced speed in the forward direction while the sun gear S idles in the reverse direction. This rotation of the carrier CR is taken out from the counterdrive gear 36.

In 2nd gear, the first brake B1 is actuated while the first clutch C1 remains engaged. Rotation of the sun gear S is stopped by the first brake B1, so that the rotating motion of the small ring gear R1 acquired from the input shaft 33 rotates the carrier CR at reduced speed in the forward direction while the large ring gear R2 idles in the forward direction. This rotation of the carrier CR is extracted as 2nd speed from the counterdrive gear 36.

In 3rd gear, the first clutch C1 remains engaged and the third clutch C3 is engaged. The rotation of the input shaft 33 is transmitted to the large ring gear R2 via the clutch C0 at the same time this rotation is transmitted to the small ring gear R1 via the clutch C1, so that the elements of the planetary gear unit 34 rotate in unison. As a result, the carrier CR also rotates in unison, so that rotational motion having the same speed as that of the input shaft 33 is extracted from the counterdrive gear 36. Though it is shown in FIG. 3 that hydraulic pressure is supplied to the brake B1 in 3rd gear, the brake B1 is not engaged and co-rotation is possible since the pressure of clutch C0 is communicating with a mechanism for releasing brake B1, as will be described later.

In 4th gear, the first clutch C1 is disengaged and the third clutch C0 and first brake B1 are actuated, whereupon the rotation of the input shaft 33 is transmitted to the large ring gear R2 via the clutch C0. Since the sun gear S is stopped from rotating by the brake B1 at this time, the carrier CR rotates at high speed while the small gear r1 idles at high speed. This rotation of the carrier CR is extracted from the counterdrive gear 36 as overdrive.

In the neutral or parking range, all of the clutches and brakes are disengaged. In the reverse range, the second clutch C2 and the second brake B2 are engaged and rotation of the input shaft 33 is transmitted to the sun gear S via the second clutch C2. Since the large ring gear R2 is held fixed by the braking action of the second brake B2 at this time, the carrier CR rotates in the reverse direction while the small ring gear R1 also rotates in the reverse direction. This reverse rotation of the carrier CR is extracted from the counterdrive gear 36.

In 1st gear in the L range (coasting), the one-way clutch Fl is free but the second brake B2 is engaged in addition to the first clutch C1. The large ring gear R2 is held fixed by the brake B2, and 1st gear is maintained to perform engine braking in an effective manner. Note that 2nd gear in the L range is the same as 2nd gear in the D range.

Figure 1:
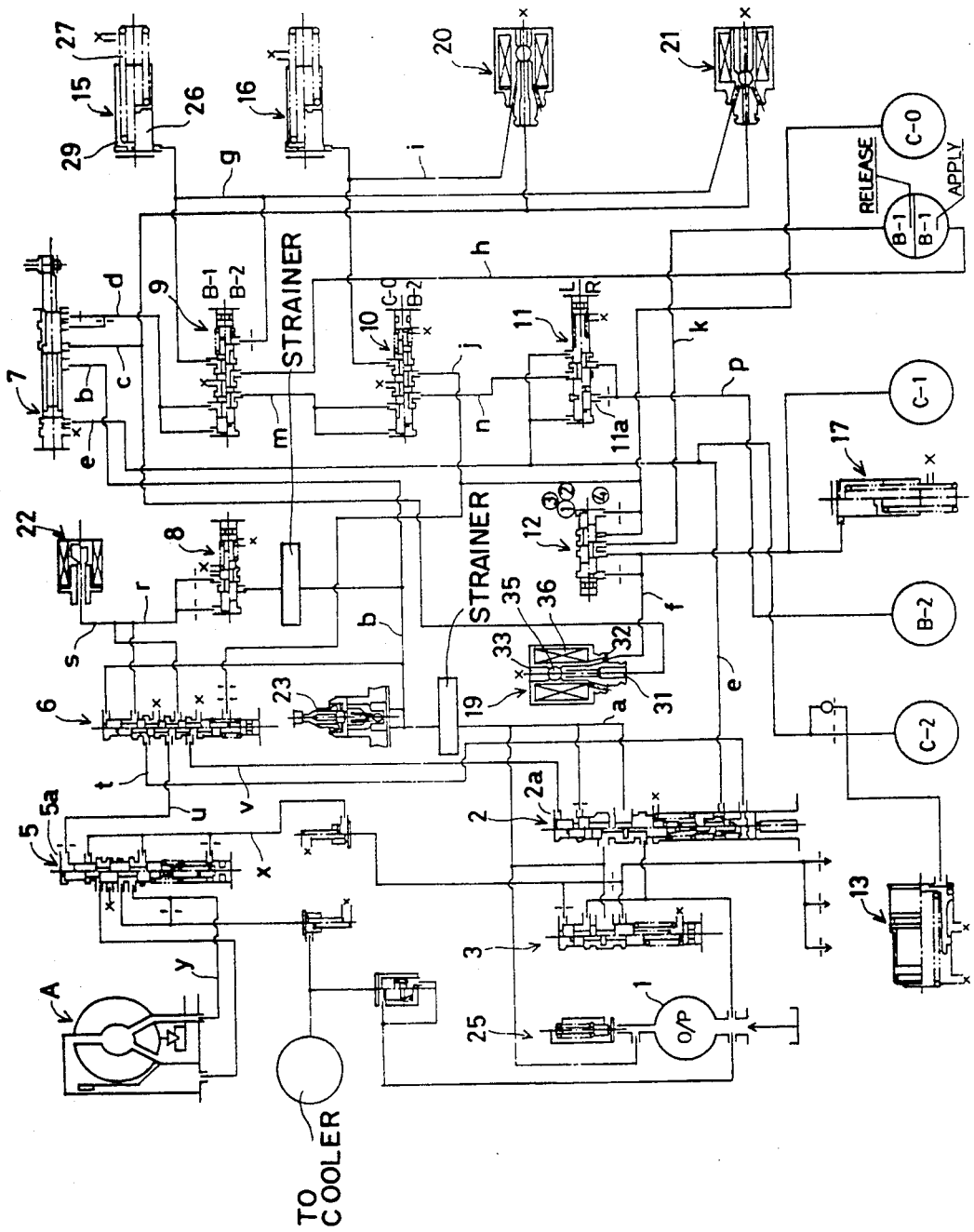
FIG. 1 is a hydraulic circuit diagram illustrating a first embodiment of hydraulic control apparatus for an automatic transmission according to the present invention.

An embodiment of the hydraulic control apparatus in the automatic transmission of the invention will now be described with reference to FIG. 1. The apparatus comprises an oil pump 1, a primary regulator valve 2, a secondary regulator valve 3, a lock-up control valve 5, a lock-up relay valve 6, a manual valve 7, a modulator valve 8, a B-1 solenoid valve 9, a C-0 relay valve 10, a low modulator valve 11, a B-1 release relay valve (shifting valve) 12, an accumulator 13 for C-2, a damping valve 15 for B-1, a damping valve 16 for C-0, a damping valve 17 for C-1, a solenoid valve 19 for C-1, a solenoid valve 20 for C-0, a solenoid valve 21 for B-1, a solenoid valve 22 for lock-up, an oil temperature sensor 23, a pressure relief valve 25, hydraulic servos B-1, B-2, C-1, C-0, C-2 for engaging and disengaging the brakes B1, B2 and clutchs C1, C0, C2, as well as check valves and orifices. In FIG. 1, the numerals ①, ②, ③, ④ shown on the right side of the B-1 release relay valve 12 indicate the speeds which prevail when the spool is fixed as shown at the upper or lower side.

The damping valves 15, 16, 17 each have a piston 29 biased by a spring 27 within a cylinder 26. The piston 29 is made of resin and therefore is light in weight. As a result, the damping action has a quick response and cost can be reduced.

The solenoid valves 19, 20, 21 for shifting are of three-way type. Each has an input port 31 through which line pressure is introduced, an output port 32, and a drain port 33. Each valve accommodates a freely movable ball 35 which selectively opens and closes the input port 31 and drain port 33. In the C-1 solenoid valve 19 and C-0 solenoid valve 20, the ball 35 closes the input port 31 and opens the drain port 33 when a coil 36 is energized, and opens the input port 31 and closes the drain port 33 when the coil 36 is deenergized. Conversely, in the B-1 solenoid valve 21, the ball 35 closes the input port 31 and opens the drain port 33 when a coil 36 is deenergized, and opens the input port 31 and closes the drain port 33 when the coil 36 is energized.

Figure 4:
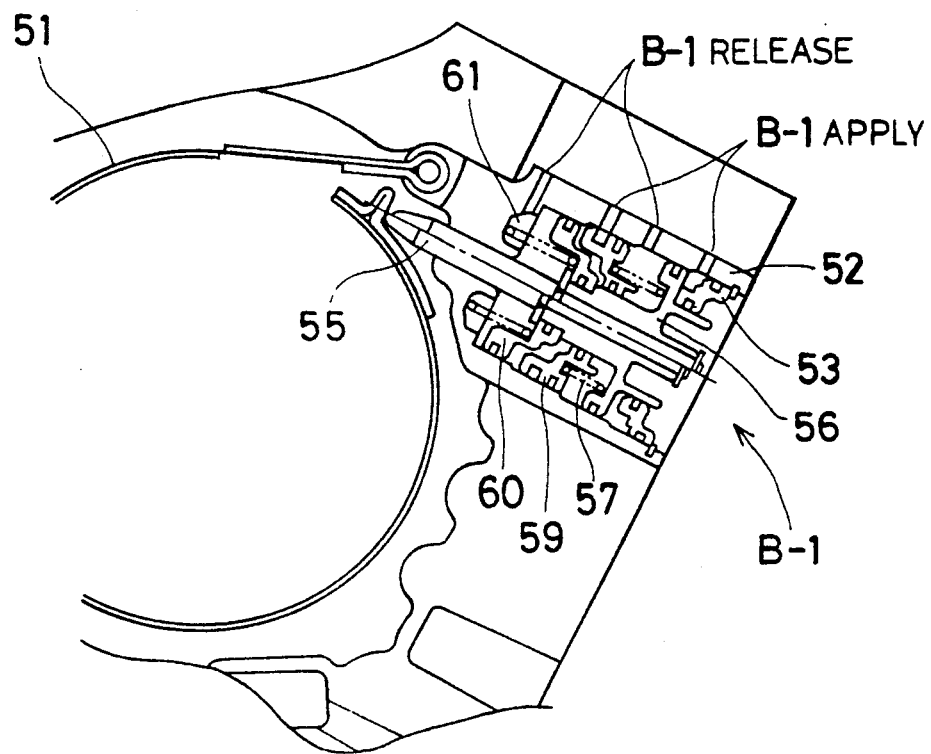
FIG. 4 is a sectional view illustrating a brake mechanism operated by the hydraulic circuit of FIG. 1.
Figure 7A:
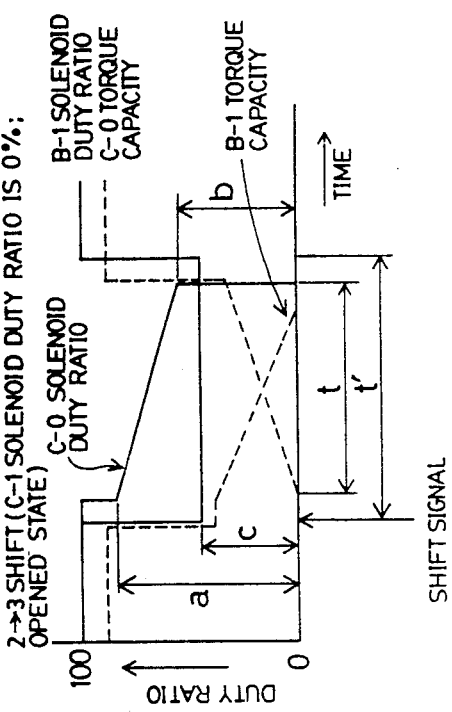
FIGS. 7a-7d are a series of graphs describing the operation of friction devices at the time of a 2-3 shift.
Figure 7C:
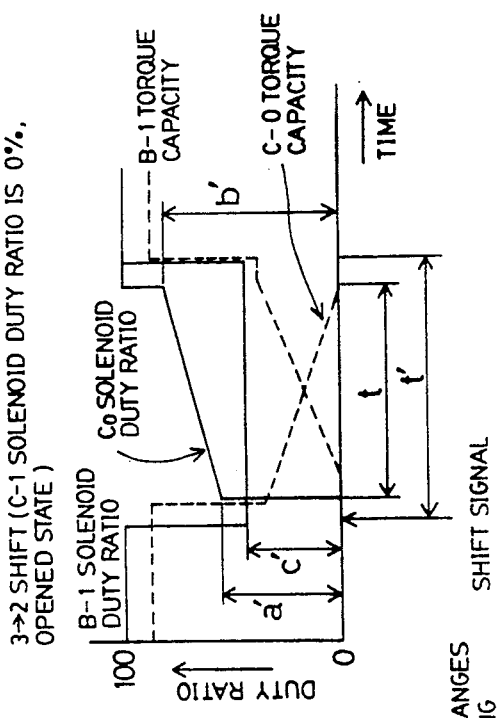
Figure 7B:
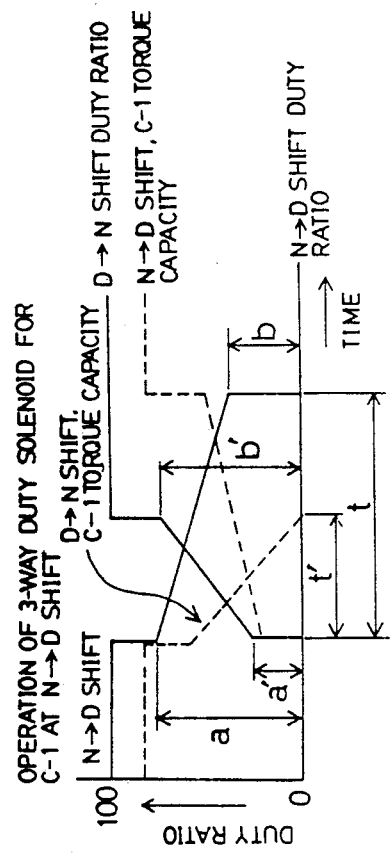
Figure 7D:
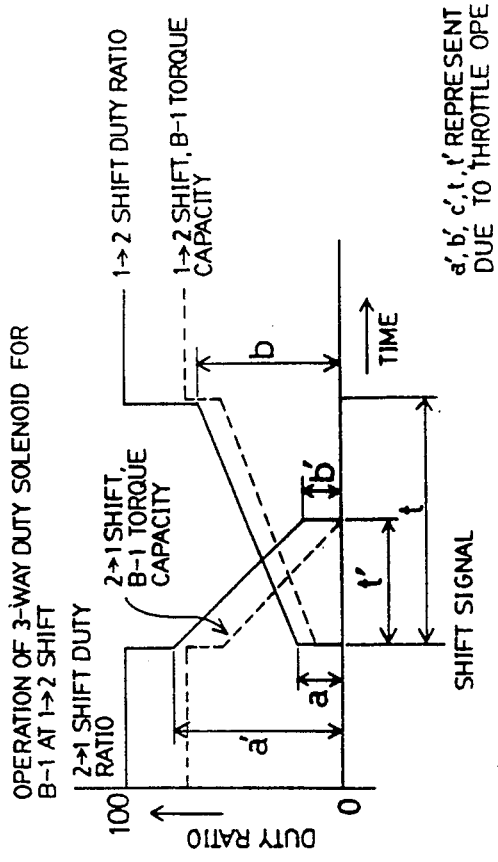

As shown in FIG. 4, the brake B1 is of the type in which a rotary member is stopped from rotating by a band brake 51. The hydraulic servo B-1 comprises a fixed ring 53 secured within a cylinder 52, a first piston 56 fitted slidably inside the cylinder 52 for sliding a brake rod 55, a second piston 59 fixedly arranged in the cylinder 52 via a spring on the inner side of the piston 56, and a third piston 60 arranged between the first piston 56 and the cylinder 52 via a spring 61. When a space formed by the fixed ring 53 and first piston 56 and a space formed by the second and third pistons 59, 60 are supplied with an apply pressure, the brake B-1 is engaged. The brake B1 is released when these spaces are drained. When release hydraulic pressure is supplied from a space formed by the first and second pistons 56, 59 and a space formed by the third piston 60 and cylinder 52 with the brake B1 in the engaged state, the brake B1 is released.

The operation of this hydraulic changeover apparatus in the automatic transmission constructed as set forth above will now be described.

Oil elevated in pressure by the oil pump 1 is supplied to the primary regulator valve 2 via an oil line a to be regulated to line pressure, and to the manual valve 7 via an oil line b. The remaining oil is supplied to the secondary regulator valve 3. The secondary pressure regulated by the latter valve is supplied to a lubrication system and to the lock-up control valve 5.

The line pressure in line b supplied to the manual valve 7 is introduced to the various oil lines, as shown in Table 1, depending upon the shift range position.

TABLE 1

|      | LINE c | LINE d | LINE e |
| ---- | ------ | ------ | ------ |
| P, N | x      | x      | x      |
| D    | o      | x      | x      |
| L    | o      | o      | x      |
| R    | x      | x      | o      |

P, N Ranges

In the P and N ranges, the hydraulic pressure in line b does not act upon the lines c, d and e, the C-1 solenoid valve 19 and C-0 solenoid valve 20 are energized, the B-1 solenoid valve 21 is deenergized, and each valve is switched over to the drain side.

D Range

As shown in FIG. 5, when the C-1 solenoid valve 19 is switched from the energized state to the deenergized state by gradually reducing the duty ratio in 1st gear in the D range, the lines c and f are brought into communication, the B-1 release valve 12 is switched over to the state illustrated and hydraulic pressure is supplied to the hydraulic servo C-1 to establish 1st gear. Since hydraulic pressure in line f can be raised or lowered freely by freely changing the duty ratio of the C-1 solenoid valve 19 at this time, the engagement of the C1 clutch can be performed smoothly and fluctuation in hydraulic pressure in line f at the time of duty control can be reduced by the damping valve 17.

When a command for shifting to 2nd gear is issued, as shown in FIG. 6, the B-1 solenoid valve 21 is switched from the deenergized state to the energized state by gradually raising the duty ratio, whereupon the lines c and g are connected. Accordingly, the B-1 relay valve 9 is changed over to the state shown in FIG. 6, and the lines g, h are brought into communication to supply hydraulic pressure to the hydraulic servo B-1, thereby engaging the B1 brake of establish 2nd gear. In this case also a smooth shift can be achieved by duty ratio control and the damping valve 15.

When a 2-3 shift is made, line pressure remains applied to the C-1 hydraulic servo. Since the hydraulic pressure is higher than the regulated pressure of the C-0 hydraulic servo, the B-1 release relay valve 12 is urged toward the right side so that the C-0 hydraulic servo and the B-1 release hydraulic servo are connected to the same circuit. In this state, regrabbing of the clutch is performed smoothly when the B-1 pressure, C-0 pressure and B-1 release pressure are controlled, as shown in FIG. 7.

By way of example, when a shift is made from 2nd to 3rd gear, the B-1 apply pressure is temporarily regulated to a low value in dependence upon throttle opening until there is almost no B-1 torque capacity to spare. In the meantime, the C-0 pressure and B-1 pressure are connected to the same circuit and gradually rise. Accordingly, at the same time that the C-0 clutch is engaged, the B-1 hydraulic servo is release by the difference between the B-1 apply pressure and B-1 release pressure, so that excellent shift time can be achieved. In this case, in the engagement and disengagement of two friction elements, the respective release and engagement hydraulic pressure characteristics control the duty ratio independently, thereby making it possible to form any desired pattern so that shift shock can be held to the minimum.

When a command for shifting to 3rd gear is issued, as shown in FIG. 8, the C-0 solenoid valve 20 is switched from the energized state to the deenergized state by gradually lowering the duty ratio, whereupon the lines c and i are connected. Accordingly, the C-0 relay valve 10 is changed over to the state shown in FIG. 8, and the lines i, j are brought into communication to supply hydraulic pressure to the hydraulic servo C-0. At the same time, lines j and k are connected via the B-1 release relay valve 12 so that hydraulic pressure is supplied to the B-1 release hydraulic servo. As a result, the B1 brake is released at excellent timing at the same time that the C0 clutch is engaged. This enables a smooth shift from 2nd to 3rd gear. In this case also a smooth shift can be achieved by duty ratio control and the damping valve 16.

Figure 9A:
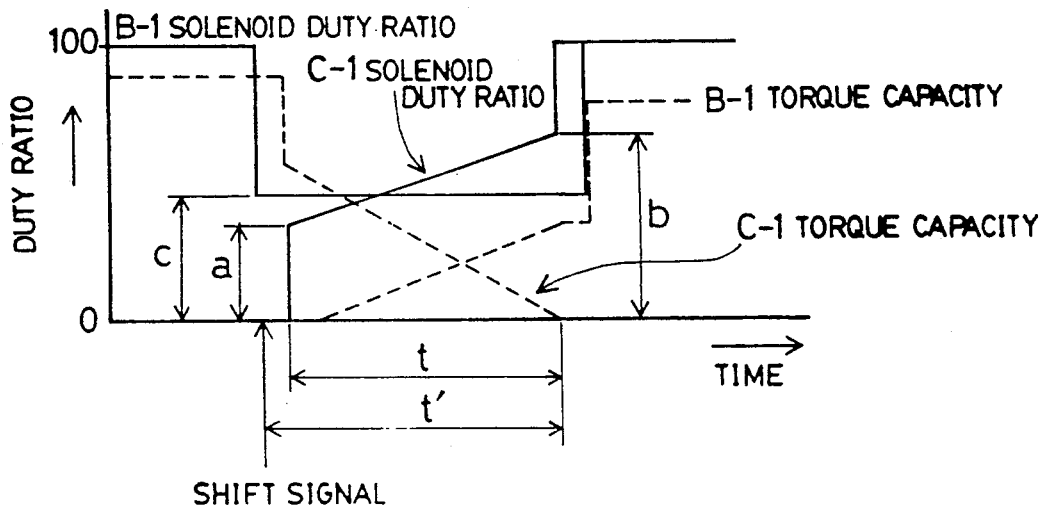
FIGS. 9a and 9b are a pair of graphs describing the operation of friction devices at the time of a 2-3 shift.
Figure 9B:
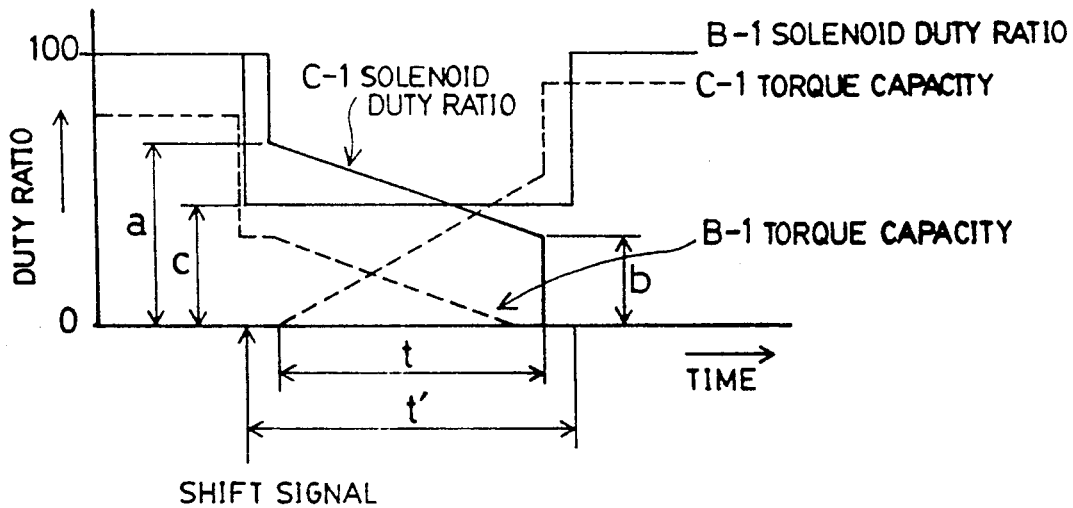

When a 3-4 shift is made, line pressure remains applied to the C-0 hydraulic servo. Since the hydraulic pressure is higher than the regulated pressure of the C-1 hydraulic servo, the B-1 release relay valve 12 is urged toward the left side so that the C-1 hydraulic servo and the B-1 release hydraulic servo are connected to the same circuit. In this state, regrabbing of the clutch is performed smoothly when the B-1 pressure, C-1 pressure and B-1 release pressure are controlled, as shown in FIG. 9. By way of example, when a shift is made from 3rd to 4th gear, the B-1 apply pressure is temporarily regulated to a low value. In the meantime, the C-1 pressure and B-1 pressure are connected to the same circuit and are gradually bled. Accordingly, at the same time that the C-1 clutch is engaged, the B-1 hydraulic servo is engaged by the difference between the B-1 apply pressure and B-1 release pressure, so that excellent shift time can be achieved.

When a command for shifting to 4th gear is issued, as shown in FIG. 10, the C-1 solenoid valve 19 is switched from the deenergized state to the energized state by gradually raising the duty ratio, whereupon the hydraulic pressure in line f is drained from the drain port 33 of the C-1 solenoid valve 19 and the hydraulic pressure is discharged from the B-1 release hydraulic servo and C-1 hydraulic servo. Accordingly, the C1 clutch is released and, at the same time, the B1 brake is engaged at a precise timing. This enables a smooth shift from 3rd to 4th gear. In this case also a smooth shift can be achieved by duty ratio control and the damping valve 16.

A downshift can be achieved by performing control which is the reverse of the foregoing.

L Range

In 1st gear of the L range, the oil line b is communicated with the lines c and d. As a consequence, the B-1 relay valve 9 is switched over to the lower position in the drawings, the lines d and m are connected, the hydraulic pressure in line m acts upon the C-0 relay valve 10 and this valve is switched over to lower position shown in the drawings, as a result of which lines m and n are communicated. Since hydraulic pressure from the line e does not act upon the low modulator valve 11, this valve is situated at the upper position in the drawings, lines n and p communicate and hydraulic pressure is supplied to the B-2 hydraulic servo to bring about engine braking. At this time feedback pressure acts upon the port 11a of the low modulator valve 11 and the pressure in line p is regulated.

R Range

Since the line b is in communication with the line e in the R range, hydraulic pressure is supplied to the C-2 hydraulic servo and hydraulic pressure from line e acts upon the low modulator valve 11, so that this valve is switched over to the position shown on the lower side in the drawings to communicate the lines e and p and supply hydraulic pressure to the B-2 hydraulic servo, thereby establishing the reverse state.

Figure 11:
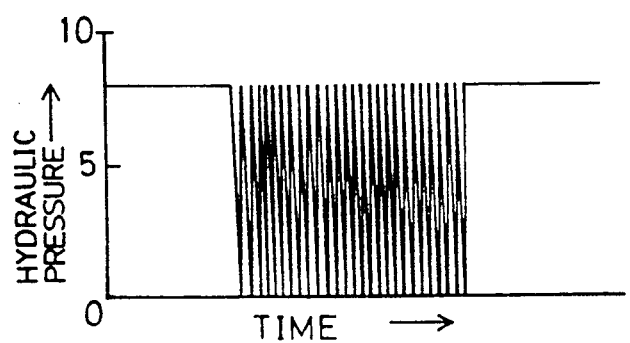
FIGS. 11 and 12 are graphs illustrating the operation of a damping valve.
Figure 12:
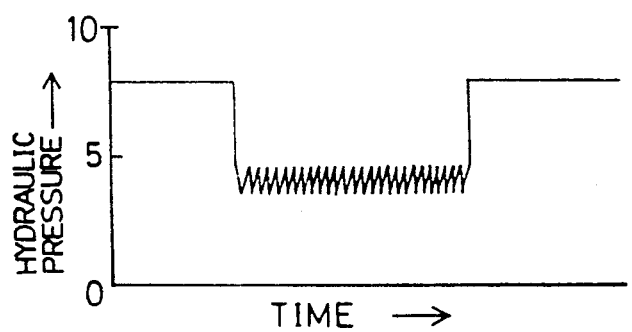

FIGS. 11 and 12 illustrate fluctuations in hydraulic pressure when damping valves are and are not provided. These views indicate that providing the damping valves reduces the pulsation in hydraulic pressure.

Figure 13:
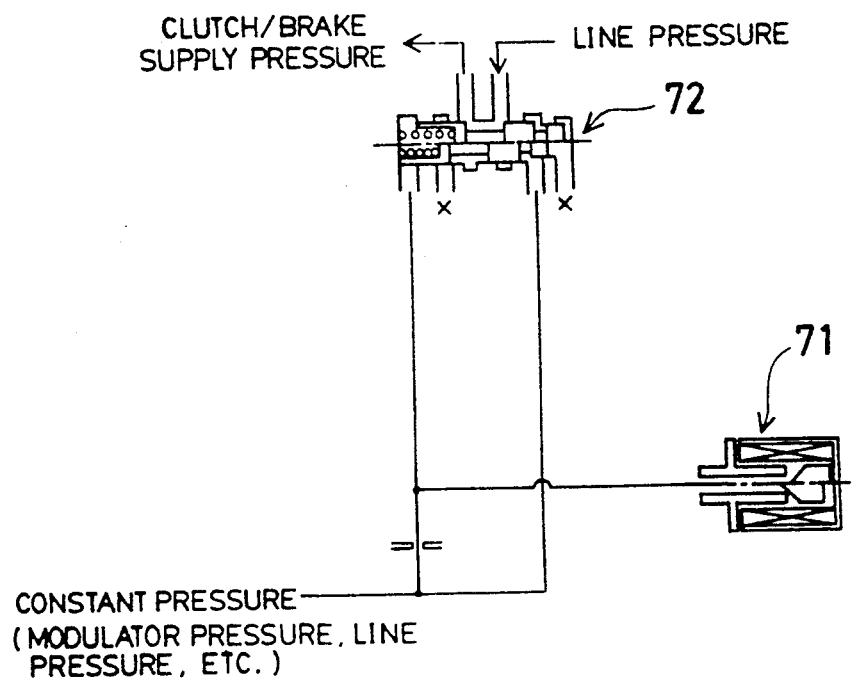
FIG. 13 is a hydraulic circuit diagram illustrating another example of a shift changeover mechanism.
Figure 14:
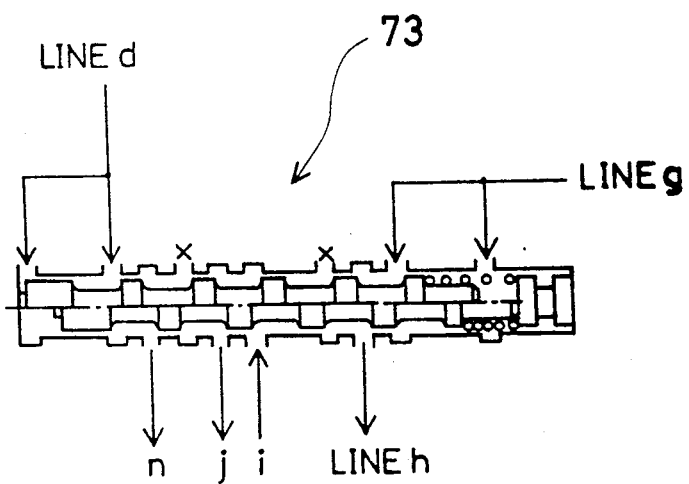
FIG. 14 is a sectional view showing another example of a relay valve.

FIG. 13 illustrates an example in which a two-way solenoid valve 71 and a pressure regulating valve 72 are combined instead of the three-way solenoid valves 19, 20, 21. FIG. 14 shows an example in which the B-1 relay valve 9 and C-0 relay valve are replaced by a relay valve 73 in which these valves are integrated.

In the above-described hydraulic circuit, there are no shift valves changed over in accordance with each speed, as is the prior art. As a result, simultaneous engagement of certain friction devices is prevented by each valve, thereby making it possible to prevent sudden stopping, spinning and the like.

Simultaneous engagement of C-0, B-2 and C-1 or C-2 is prevented by the C-0 relay valve 10. Simultaneous engagement of B-1 and B-2 is prevented by the B-1 relay valve 9. Simultaneous engagement of C-2, B-1 and C-1 or C-0 is prevented by the manual valve 7. Simultaneous engagement of C-0, B-1 and C-1 is prevented by the B-1 release hydraulic servo. Simultaneous engagement of C-2, B-2 and C-1 is prevented by the manual valve 7.

Described next will be operation when a solenoid and its power supply in the foregoing hydraulic circuit become disconnected.

In the P and N ranges, the line b is cut off by the manual valve 7, so that the transmission assumes the neutral state irrespective of whether the solenoid is on or off.

In the R range, the line b is in communication with the line e, and hydraulic pressure is supplied to the C-2 and B-2 hydraulic servos to establish the reverse state, irrespective of whether the solenoid is on or off.

In the D and 2 ranges, line b is in communication with line c and hydraulic pressure is supplied to the C-1 solenoid valve 19, the C-0 solenoid valve 20 and the B-1 solenoid valve 21. If a solenoid becomes disconnected, hydraulic pressure is supplied when the C-1 solenoid valve 19 and C-0 solenoid valve 20 are deenergized, and hydraulic pressure is supplied when the B-1 solenoid valve is energized. As a result, the 3rd speed state is established.

In the L range, line b is in communication with lines c and d, the C-1 solenoid valve 19 and C-0 solenoid valve 20 open the oil lines, just as in the D range, and hydraulic pressure is supplied to the C-1 and C-0 hydraulic servos. However, since the hydraulic pressure in line d urges the C-0 relay valve rightward, lines i, j, which define the C-0 hydraulic pressure supply circuit, are shut off. Since hydraulic pressure is supplied to the B-2 hydraulic servo through the lies d, m, n and p, C-1 and B-2 engage to establish the 1st gear state.

Thus, even if a solenoid becomes disconnected, neutral, 1st and 3rd forward gears and reverse can be selected by changing over the manual valve.

Figure 15:
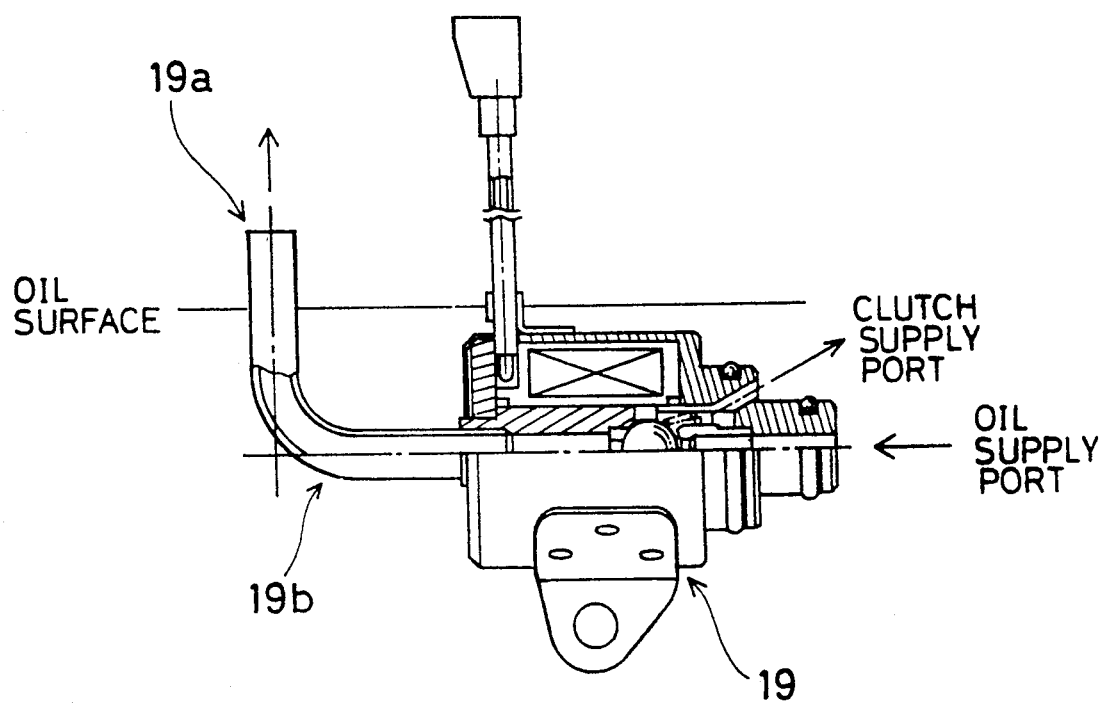
FIG. 15 is a view, partially in cross-section, showing an example of a three-way solenoid suitable for use in the present invention.

An example of the arrangement of the three-way solenoid valves 19–21 will now be described with reference to FIG. 15. Conventionally, the drain port of a rotating clutch is disposed in air above the oil level by the oil passageway of the valve body. Consequently, the arrangement is such that even if the clutch is rotated in the drain state, the oil will not be drawn in by pumping action produced by the centrifugal force of the clutch. However, with a three-way solenoid valve, the drain port of the clutch is located at the back end of the solenoid. Therefore, if the solenoid is placed in the oil, the oil is drawn in by the pumping action resulting from the centrifugal force of the clutch, and a centrifugal hydraulic pressure is produced that engages the clutch, even though the clutch is supposed to be in the disengaged state. To avoid this, a drain tube 19b is attached to the drain port of the three-way solenoid valve 19, and the outlet 19a of the drain tube 19 is arranged to project from the surface of the oil.

Line pressure control and lock-up clutch control in the aforementioned hydraulic circuit will now be described.

When the engine is rotated and the oil pump 1 is driven into operation, line pressure is generated in line b by the action of the primary regulator valve 2, so that hydraulic pressure acts upon the upper port of the lock-up relay valve 6, whereby the lock-up valve 6 is urged downwardly (the left-side position in the drawings). This state is established in gears other than the 3rd and 4th gear of the D range, and lines r and s are communicated with lines t and v, respectively. When the duty ratio of the lock-up solenoid valve 22 is varied in dependence upon throttle opening in this state, hydraulic pressure acts upon port 2a of the primary regulator valve 2 and line pressure changes due to valve equilibrium. In the R range, line pressure acts also upon the oil line e, so that overall line pressure is regulated to a high value.

In the 3rd and 4th gear states of the D range, hydraulic pressure is applied from line j to the lower port of lock-up relay valve 6 by the C-0 solenoid valve 20. As a consequence, the lock-up relay valve 6 is urged upwardly (to the right-side position in the drawings), the line r is shut off, the line s is communicated with the line u, and the line v is drained. If the duty ratio of the lock-up solenoid valve 22 is varied in dependence upon the throttle opening in this state, the hydraulic pressure at the control port 5a of lock-up control valve 5 changes to vary secondary pressure from line x to line y, whereby on/off control and slip control of the lock-up clutch are performed. In this case, lines t, v are drained, so that line pressure is regulated to a low, constant pressure.

Figure 16:
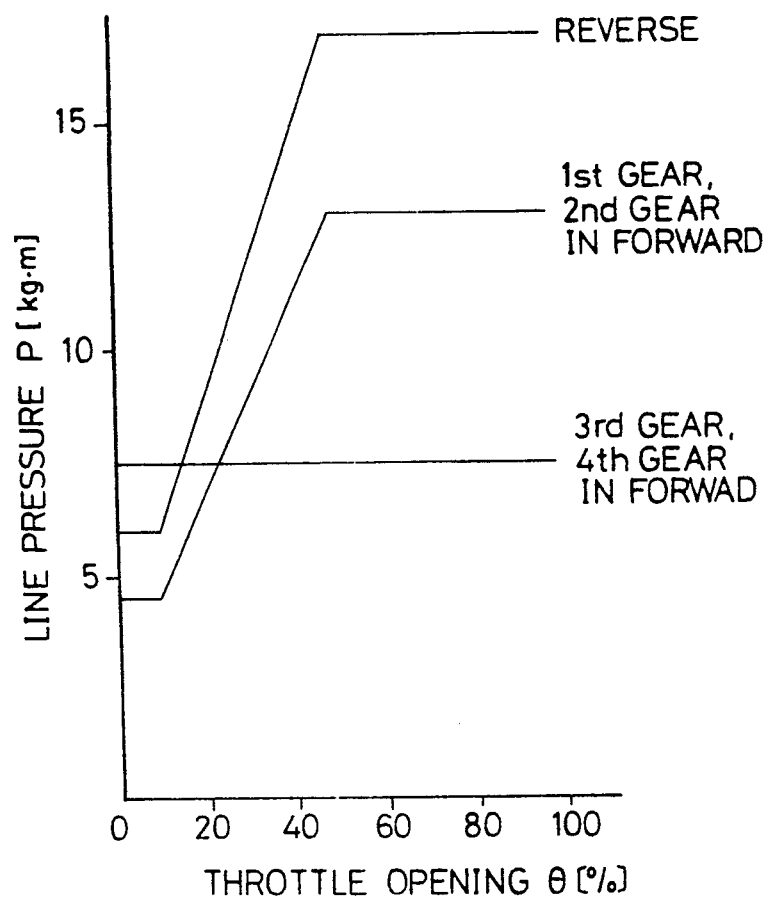
FIG. 16 is a graph describing line pressure characteristics.

FIG. 16 illustrates the abovementioned line pressure regulating characteristics. Specifically, since there is little lock-up clutch action in 1st and 2nd gears, lock-up clutch control is not carried out. Further, since stall start occurs in 1st and 2nd gears, it necessary to raise the line pressure at high throttle, and line pressure control is performed by the lock-up solenoid valve. In 3rd and 4th gears, on the other hand, the effectiveness of the lock-up clutch increases and a low line pressure suffices.

Hence, lock-up control is performed and line pressure is maintained at a constant, low value.

Figure 17A:
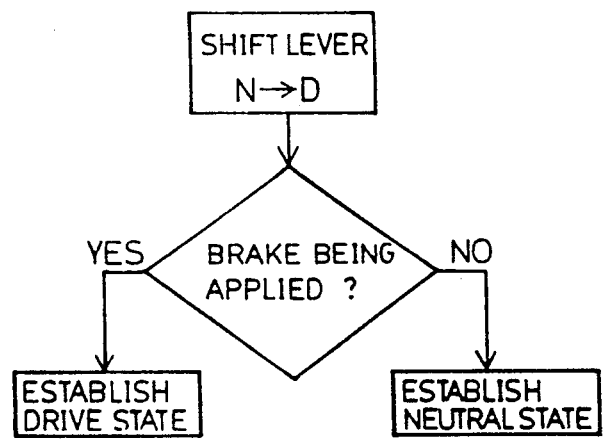
FIGS. 17a and 17b show flowcharts for describing the brake-inhibit processing.
Figure 17B:
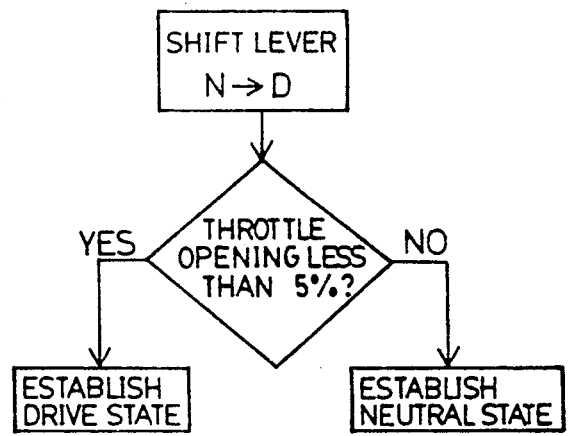

Next, reference will be had to FIG. 17 to describe a safety device which will not allow a transition to drive unless the brake is being applied when a shift is made from the N range to the D range. In accordance with the invention, the forward clutch C1 is directly controlled by the C-1 solenoid valve 19, so that a mechanism that inhibits a shift from the N range to the D range can readily be provided. In (a) of FIG. 17, line pressure in line b acts upon the C-1 solenoid valve 19 via line c when the manual valve 7 is placed in the D range. Whether or not the brake is being applied is sensed by a sensor, the output of which is applied to a computer. If it is found that the brake is not being applied, the C-1 solenoid valve 19 is opened to the drain side, so that the neutral state is maintained. In (b) of FIG. 17, it is also possible to check the throttle opening (i.e., determine if the throttle opening is 5% or less, by way of example). Still another option is to check both application of the brake and throttle opening in combination before deciding whether to establish the drive or neutral state.

A reverse-inhibit mechanism, which exemplifies another embodiment of the invention, will now be described with reference to FIGS. 18 through 22. In the present invention, the B-1 solenoid 21, which is not used when the transmission is in reverse, is connected to a reverse-inhibit circuit by a reverse relay valve 75, and the B-1 solenoid valve 21 is subjected to computer control, whereby the low modulator valve 11 is controlled to engage and release the B-2 brake and C-2 clutch.

Figure 18:
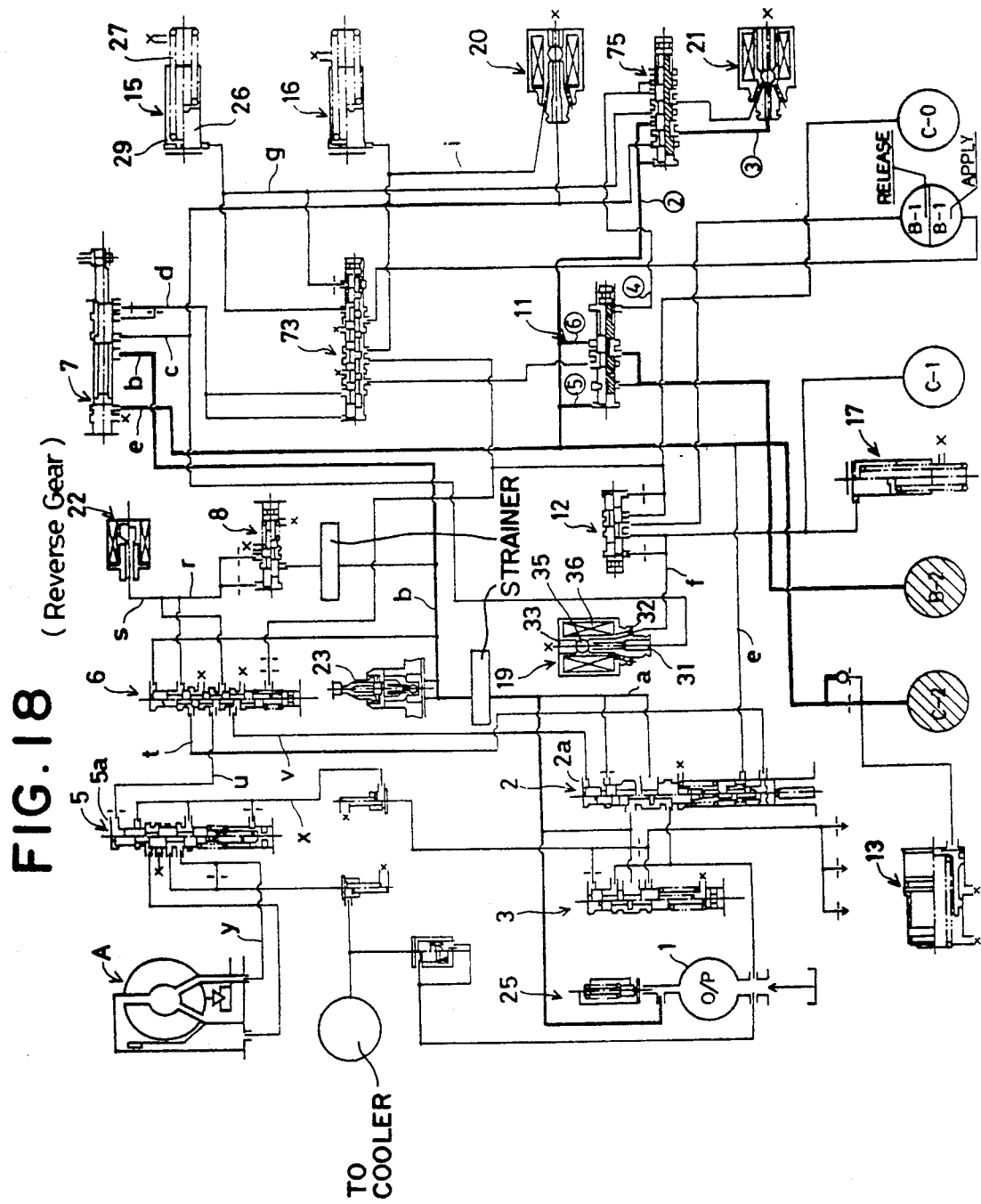

The hydraulic circuit of FIG. 18 is obtained by providing the hydraulic circuit of FIG. 1 with the reverse relay valve 75. The B-1, C-0 relay valves 9, 10 in FIG. 1 are replaced by the relay valve 73 described in conjunction with FIG. 14. FIG. 18 illustrates the flow of hydraulic pressure when the transmission is put in reverse (with vehicle velocity being less than a fixed velocity). When the manual valve 7 is changed over to the R range, the line pressure of line b is communicated with line e, so that the reverse relay valve 75 is moved to the right side in the drawing. Accordingly, line pressure travels from line ② to line ③ to act upon the B-1 solenoid valve 21.

If vehicle velocity at the moment of a shift is less than a fixed value, the B-1 solenoid valve 21 is deenergized. As a result, the low modulator valve 11 is moved rightward by line pressure which enters line ⑤, so that line pressure supplied to line ⑥ is supplied to the B-2 hydraulic servo via the line p. At the same time, the C-2 clutch is engaged while the C-2 accumulator 13 operates and performs pressure regulation. The reverse state is established as a result.

If vehicle velocity at the moment of a shift is greater than a fixed value, the B-1 solenoid valve 21 is energized, as shown in FIG. 19. As a result, the line pressure in line ③ acts upon the low modulator valve 11 via line ④, so that the low modulator valve 11 is moved to the left side. As a consequence, no hydraulic pressure is supplied to the B-2 hydraulic servo and, hence, the neutral state is attained.

Figure 20A:
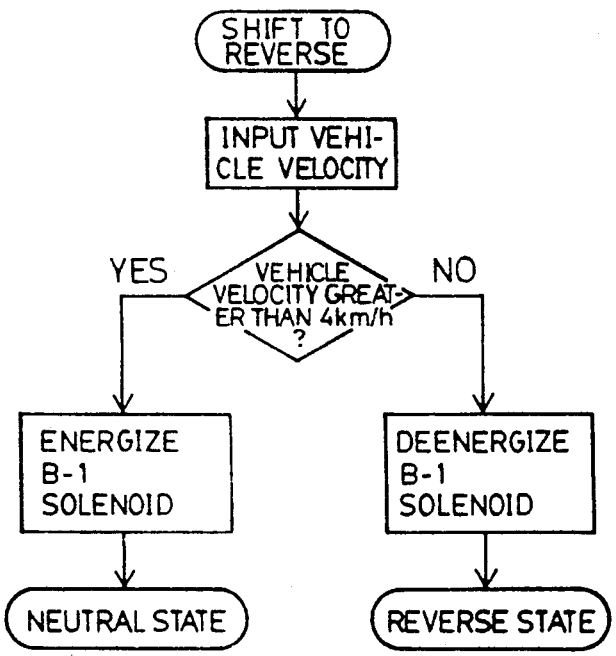
FIGS. 20a and 20b show flowcharts for describing the reverse-inhibit processing.
Figure 20B:
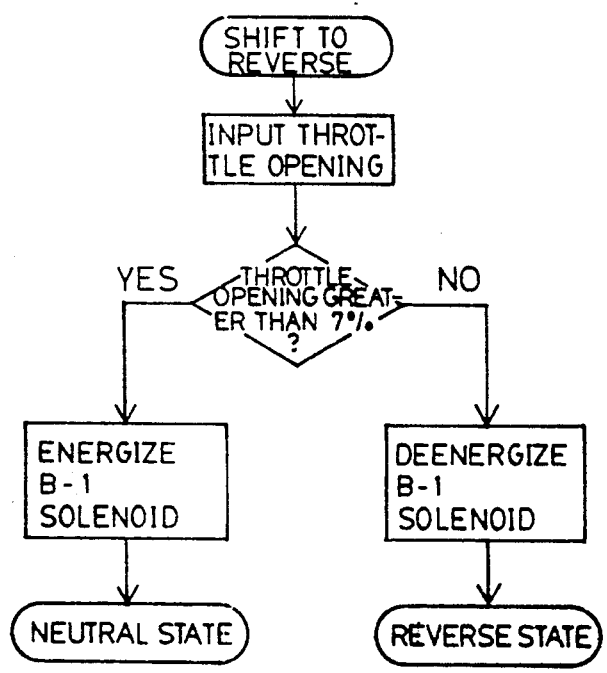

FIGS. 20(a), (b) are flowcharts illustrating the above-described reverse inhibit control. In (a) of FIG. 20, vehicle velocity is the criterion used in deciding whether to perform the inhibiting operation. In (b) of FIG. 20, the criterion used is throttle opening.

FIGS. 21 and 22 illustrate another embodiment of the reverse-inhibit mechanism.

FIG. 21 illustrates the flow of hydraulic pressure when the transmission is put in reverse (with vehicle velocity being less than a fixed velocity). When the manual valve 7 is changed over to the R range, the line pressure of line b is communicated with line e, so that the reverse relay valve 75 is moved to the right side in the drawing. Accordingly, line pressure travels from line ② to line ③ to act upon the B-1 solenoid valve 21.

If vehicle velocity at the moment of a shift is less than a fixed value, the B-1 solenoid valve 21 is deenergized. As a result, the low modulator valve 11 is moved rightward by line pressure which enters line ⑤, so that line pressure supplied to lines ⑥, ⑦ is transmitted to lines ⑧, ⑨, respectively. The B-2 hydraulic servo is thus supplied with hydraulic pressure. At the same time, the C-2 clutch is engaged while the C-2 accumulator 13 operates and performs pressure regulation. The reverse state is established as a result.

If vehicle velocity at the moment of a shift is greater than a fixed value, the B-1 solenoid valve 21 is energized, as shown in FIG. 22. As a result, the line pressure in line ③ acts upon the low modulator valve 11 via line ④, so that the low modulator valve 11 is moved to the left side. As a consequence, no hydraulic pressure is supplied to the C-2, B-2 hydraulic servos and, hence, the neutral state is attained.

It should be noted that the present invention is not limited to the foregoing embodiments but can be modified in various ways.

For example, though the invention is applied to a four-speed automatic transmission in the above embodiments, it goes without saying that the invention is applicable also to three- and five-speed automatic transmissions.

What is claimed is:

1. A hydraulic control apparatus for a vehicular automatic transmission having a plurality of friction devices for selectively coupling a number of rotary elements in a planetary gear mechanism to one another, each friction device having an associated hydraulic operator for engaging the friction device responsive to engaging hydraulic pressure received by the hydraulic operator and a hydraulic circuit for controlling changeover of said friction devices by regulating the engaging hydraulic pressures received by said hydraulic operators, wherein said hydraulic circuit comprises:

a source of fluid pressure;

a plurality of shift solenoid valves, each of said shift solenoid valves being associated with one of said hydraulic operators, for directly controlling the engaging hydraulic pressure received by the associated hydraulic operator when a shift is made, each of said shift solenoid valves receiving fluid pressure and regulating said fluid pressure to the engaging hydraulic pressure responsive to a control signal, whereby said engaging hydraulic pressure is gradually changed for smooth operation of the associated hydraulic operator;

a plurality of damping valves, each associated with a shift solenoid valve for receiving the engaging hydraulic pressure in parallel with the associated hydraulic operator, for reducing fluctuations in the engaging hydraulic pressure received by the associated hydraulic operator;

a manual valve and a plurality of relay valves for controlling the sequence in which fluid pressure is communicated to said shift solenoid valves, said relay valves being controlled by said shift solenoid valves; and said solenoid valves being duty-controlled independently of one another.

2. Hydraulic control apparatus in accordance with claim 1 having only a single accumulator.

3. A hydraulic control apparatus for a vehicular automatic transmission for transmitting engine torque to an output shaft, the transmission having a plurality of friction devices for selectively engaging an element of a planetary gear mechanism to establish a shift change, said apparatus comprising:

a source of fluid pressure;

first and second friction devices for establishing a shift change, responsive to said fluid pressure selectively communicated to one of said first and second friction devices from the fluid pressure source, and for fully engaging the output shaft of the automatic transmission by simultaneous engagement of both of said first and second friction devices;

a first relay valve between the fluid pressure source and the two friction devices for selectively communicating the fluid pressure to said first and second friction devices by switching between a first position where fluid communication is established between said fluid pressure source and one of said first and second friction devices and a second position where fluid communication is established between said fluid pressure source and the other of said first and second friction devices;

a first solenoid valve provided between the fluid pressure source and the first relay valve and means for controlling the duty ratio of the first solenoid valve to thereby gradually change the fluid pressure supplied to the first friction device from the fluid pressure source via the first relay valve, for smooth engagement of the first friction device; and a manual valve between the fluid pressure source and the first relay valve for supplying a first fluid control pressure to the first relay valve for switching the first relay valve.

4. Hydraulic control apparatus in accordance with claim 3, wherein the first solenoid valve supplies a second fluid control pressure to the first relay valve for switching the first relay valve to said first position and wherein said first fluid control pressure switches the first relay valve to said second position.

5. Hydraulic control apparatus according to claim 4, further comprising:

a third friction device for establishing a shift change responsive to fluid pressure received from the fluid pressure source and fully engaging the output shaft of the automatic transmission simultaneously with said other friction device;

a second relay valve provided between the first relay valve and the third and said other friction devices for selectively communicating the fluid pressure received through said first relay valve to either said other friction device or said third friction device by switching responsive to the fluid pressure supplied by the manual valve for switching the first relay valve; and a second solenoid valve provided between the fluid pressure source and the second relay valve for controlling fluid pressure supplied to the third friction device from the fluid pressure source via the second relay valve.

6. A hydraulic control apparatus according to claim 5, further comprising:

a first damping valve provided between the first solenoid valve and the first relay valve for reducing fluctuation in the fluid pressure controlled by the first solenoid valve; and a second damping valve provided between the second solenoid valve and the second relay valve for reducing fluctuation in the fluid pressure controlled by the second solenoid valve.

7. A hydraulic control apparatus according to claim 4, further comprising:

a first damping valve provided between the first solenoid valve and the first relay valve for reducing fluctuation in the fluid pressure supplied to said one friction device.

8. A hydraulic control apparatus according to claim 3, further comprising:

a first damping valve provided between the first solenoid valve and the first relay valve for reducing fluctuation in the fluid pressure supplied to said one friction device.

9. A hydraulic control apparatus for a vehicular automatic transmission with a plurality of friction devices for selectively engaging an element of a planetary gear mechanism to establish a shift change, said hydraulic control apparatus comprising:

a source of fluid pressure;

a primary regulator valve for regulating the fluid pressure from the fluid pressure source to a line pressure;

first and second friction devices for establishing a shift change, responsive to the fluid pressure selectively communicated to said first and second friction devices from the primary regulator valve;

a third friction device for transmitting engine torque to the planetary gear mechanism;

a fourth friction device for establishing a reverse range by engagement simultaneously with engagement of the first friction device;

a first relay valve between the primary regulator valve and the first and second friction devices for selectively communicating the fluid pressure to said first and second friction devices by switching between a first position where fluid communication is established between the primary regulator valve and one of said first and second friction devices and a second position where fluid communication is established between the primary regulator valve and the other of said first and second friction devices;

a first solenoid valve provided between the primary regulator valve and said first relay valve for switching said first relay valve and means for electrically controlling the first solenoid valve to gradually change hydraulic pressure supplied to said second friction device from the primary regulator valve via the first relay valve and thereby provide said second friction device with a regulated hydraulic pressure, for smooth engagement of the first friction device said first relay valve providing direction fluid communication, at said regulated pressure, between said first solenoid valve and said second friction device;

a manual valve between the primary regulator valve and the first relay valve for supplying a first fluid control pressure to the first relay valve for switching the first relay valve, and between the primary regulator valve and the fourth friction device for supplying said line pressure to said fourth friction device to establish reverse gear by engagement simultaneously with said first friction device.

10. A hydraulic control apparatus according to claim 9, wherein said first friction device establishes a downshift responsive to manual selection of a downshift and wherein said second friction device establishes 2nd gear by engagement simultaneously with engagement of the third friction device.

11. A hydraulic control apparatus according to claim 9, further comprising:
a third solenoid valve provided between the primary regulator valve and the third friction device and means for electrically controlling the third solenoid valve to thereby gradually change the hydraulic pressure supplied to the third friction device.

12. A hydraulic control apparatus according to claim 9, further comprising:
a fifth friction device for establishing a shift change responsive to the hydraulic pressure received from the primary regulator valve and fully engaging the output shaft of the automatic transmission simultaneously with said first friction device;
a second relay valve provided between the first relay valve and the third and the other friction devices for selectively communicating the line pressure received through the first relay valve to either said first friction device or said fifth friction device by switching responsive to the line pressure supplied through said manual valve and said first relay valve; and
a second solenoid valve provided between the primary regulator valve and the second relay valve and means for electrically controlling the second solenoid valve to thereby gradually change hydraulic pressure supplied to the fifth friction device from the primary regulator valve via the second relay valve when said second friction device is disengaged.

13. A hydraulic control apparatus according to claim 12, wherein said fifth friction device establishes third gear by engagement simultaneously with engagement of the third friction device.

14. A hydraulic control apparatus according to claim 12, wherein:
said first relay valve and said second relay valve are combined in a single valve body; and wherein
said single valve body is located between the primary regulator valve and the first, second and fifth friction devices for selectively communicating the line pressure from the primary regulator valve to the first friction device through the manual valve, the fluid pressure regulated by the first solenoid valve to the second friction device, and the fluid pressure regulated by the second solenoid valve to the first friction device.

15. A hydraulic control apparatus according to claim 12, wherein said second friction device comprises a brake;
said brake including an apply chamber for engaging the brake by supplying hydraulic pressure thereto and a release chamber for disengaging the brake by supplying hydraulic pressure thereto;
said second solenoid valve regulating the hydraulic pressure from the primary regulator valve supplied to said first friction device and to said release chamber via said second relay valve.

16. A hydraulic control apparatus according to claim 12, wherein:
said first solenoid valve, upon being energized, regulates the hydraulic pressure supplied said second friction device;
wherein said second solenoid valve, upon being energized, regulates the hydraulic pressure supplied said fifth friction device;
wherein a third solenoid valve, upon being energized, regulates the hydraulic pressure supplied to said third friction device.

17. A hydraulic control apparatus according to claim 12, wherein fourth gear is established by engagement of said second friction device simultaneously with engagement of said fifth friction device and engagement of said third friction device.

* * * * *

UNITED STATES PATENT AND TRADEMARK OFFICE
CERTIFICATE OF CORRECTION

PATENT NO. : 5,085,103
DATED : February 4, 1992
INVENTOR(S) : ANDO et al

It is certified that error appears in the above-identified patent and that said Letters Patent is hereby corrected as shown below:

Col. 14, line 33, delete "fluid" and insert --line--;

line 43, delete "fluid" and insert --line--; and line 62, delete "direction" and insert --direct--.

Col. 16, line 14, delete "first" and insert --fifth--.

Signed and Sealed this

Fourteenth Day of September, 1993

Attest:

BRUCE LEHMAN

Attesting Officer

Commissioner of Patents and Trademarks